United States Patent [19]
Gibbs

[11] Patent Number: 5,239,363
[45] Date of Patent: Aug. 24, 1993

[54] RING LASER GYROSCOPE DITHER SIGNAL REMOVER

[75] Inventor: Bruce H. Gibbs, Berkshire, England

[73] Assignee: British Aerospace Public Limited Company, London, England

[21] Appl. No.: 867,075

[22] Filed: Apr. 14, 1992

Related U.S. Application Data

[63] Continuation of Ser. No. 586,072, Sep. 21, 1990, abandoned.

[30] Foreign Application Priority Data

Sep. 22, 1989 [GB] United Kingdom ............... 8921460

[51] Int. Cl.⁵ ............................................. G01C 19/64
[52] U.S. Cl. .................................................. 356/350
[58] Field of Search ........................... 356/350; 372/94

[56] References Cited

U.S. PATENT DOCUMENTS

| | | | |
|---|---|---|---|
| 3,627,425 | 12/1971 | Doyle | 356/106 |
| 4,826,320 | 5/1989 | Callaghan et al. | 356/350 |

FOREIGN PATENT DOCUMENTS 0168785 7/1985 European Pat. Off. .
0259074 8/1987 European Pat. Off. .

*Primary Examiner*—Samuel A. Turner
*Attorney, Agent, or Firm*—Cushman, Darby & Cushman

[57] ABSTRACT

Dither applied to ring laser gyroscopes in order to counteract lock-in results in an unwanted signal that appears in the gyroscopes output. The invention is a way of reducing the unwanted signal due to dither. The proposed solution comprises decoding the gyroscope output signal into respective signals which represent clockwise and counter-clockwise motion, delaying a portion of each of these signals, and combining the delayed and non-delayed signals to derive an output representative of rotation of the gyroscope—the dither having a reduced effect on the output.

4 Claims, 5 Drawing Sheets

RING LASER GYROSCOPE DITHER SIGNAL REMOVER

This is a continuation of application Ser. No. 07/586,072, filed on Sep. 21, 1990, which was abandoned upon the filing hereof.

This invention relates to ring laser gyroscopes and is more particularly concerned with compensating for the errors introduced by the application of dither to ring laser gyroscopes.

As is well known, a ring laser gyroscope employs two beams of light which pass in opposite directions around a cavity which is defined by a combination of passages and reflective surfaces within a dielectric block. When the block is rotated, the frequencies of the two light beams change relative to one another by an amount which, ideally, is proportional to the angular rotation rate of the cavity. However, the performance of real gyroscopes is adversely affected by a phenomenon known as lock-in. This occurs at low rotation rates and is due to backscatter of light at the mirrors and any other components in the cavity. The backscattered light causes the interaction of the two light beams which locks their frequencies together so that there is no frequency difference until the rotation rate reaches a certain value.

To counteract lock-in, it is desirable to impart a bias to the light beams such that a non-reciprocal phase shift is introduced thereto. One such method of imparting a bias is by the application of dither to the ring laser gyroscope. The dither is usually a mechanical vibration applied to the gyroscope block which substantially eliminates lock-in, but a component of the dither appears in the gyroscope's output signal. While the output signal is still true a representation of gyroscope motion, the dither component is an unwanted signal from the point of view of the gyroscope user.

Various methods of eliminating the dither component have been proposed. Optical systems are difficult to manufacture, fragile and susceptible to the adverse effects of vibration, contamination, temperature and condensation. Conventional electronic systems work by generating an electronic signal which is a model of the dither motion and which is subtracted from the gyroscope output signal. This model is generated by a transducer which measures the dither motion, and it is this transducer which limits the accuracy of the system and increases the complexity. Closed-loop systems have also been suggested, where the dither model is adjusted for both amplitude and phase by a servo system which attempts to zero the component of the gyroscope's output signal which is at dither frequency. As a result, better accuracy is achieved but only at the expense of even greater complexity.

The object of this invention is to provide a simpler and more accurate method of dither signal compensation than those which are currently known.

Reference will now be made, by way of example, to the accompanying drawings in which.

Figure 1:
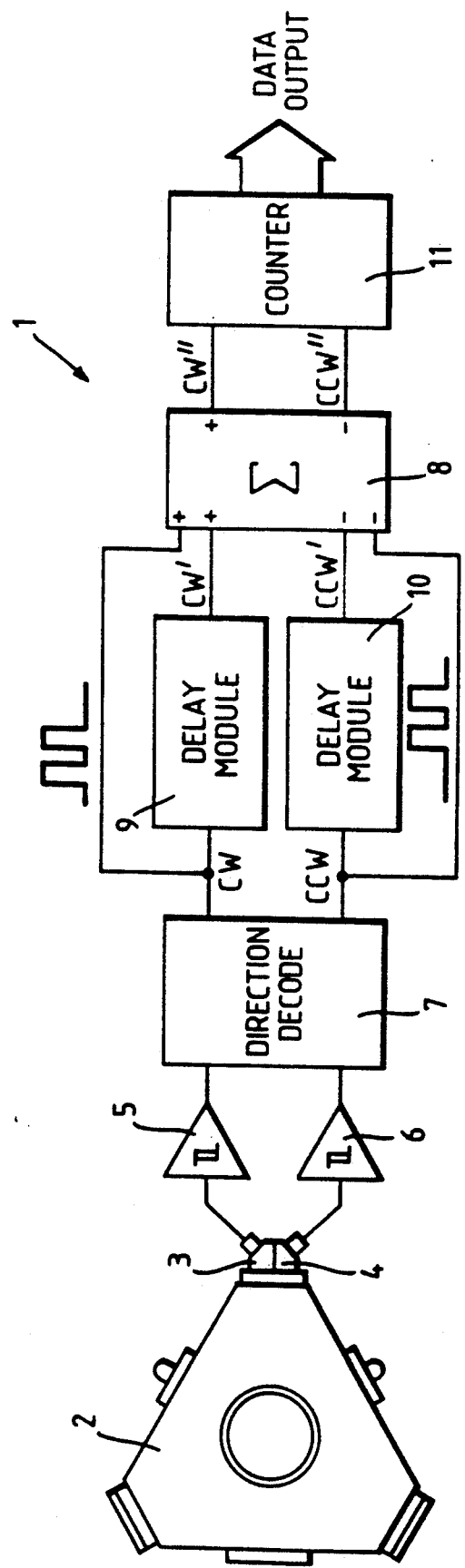
FIG. 1 is a diagrammatic plan view of a ring laser gyroscope body and a simplified circuit diagram of gyroscope output signal processor incorporating a dither signal compensation circuit.

FIG. 1 shows a ring laser gyroscope comprising a body 2 and coupled to a dither signal compensation circuit 1. A signal formed from the two counter rotating light beams within the ring laser gyroscope body 2, which represents angular rate and dither, is detected by two diodes 3 and 4 connected to the body 2. The signals are usually sinusoidal with a frequency proportional to the angular rate of the gyroscope and having a phase difference due to the beam combining prism on which the two diodes 3 and 4 are mounted. A typical value of phase difference is $\pm 90°$, the sign depending on the direction of gyroscope motion. The two sinusoids are converted into square waves by application to respective Schmitt triggers 5 and 6. Direction decoder 7 decodes the square wave signals from the Schmitt triggers 5 and 6 into two pulse trains representative of clockwise and counter-clockwise rotation respectively. Each pulse represents a finite angular rotation of the gyroscope 2 in inertial space. Consequently, the existence of clockwise or counter-clockwise pulses at any instant are mutually exclusive and the absolute rotation of the gyroscope 2 is proportional to the difference between the number of clockwise and counter-clockwise pulses.

The clockwise pulse train CW is applied to two paths, the first of which leads directly to pulse summer 8, and the second of which leads to pulse summer 8 via a time delay module 9 which delays the signal for a time equivalent to half the period of the dither signal. The non-delayed and delayed pulses are added together by the pulse summer 8 to provide a first output CW".

The counter-clockwise pulse train CCW is applied to two paths in the same way as the clockwise pulse train. Time delay module 10 also has a time delay equivalent to half the period of the dither signal. The non-delayed and delayed pulses CCW and CCW' respectively are then added together by the pulse summer 8 to provide a second output CCW".

The first and second outputs CW" and CCW" from pulse summer 8 are applied to the respective increment and decrement inputs of counter 11 which produces an output representative of absolute rotation of the gyroscope body 2.

If the dither signal is symmetrical (as it usually is), the dither component in the output signal due to the clockwise motion is cancelled by the half dither period delayed signal due to the preceding counter-clockwise dither motion. The dither component in the output signal due to the counter-clockwise dither motion is similarly cancelled by the delayed clockwise dither signal.

Each pulse train from direction decoder 7 due to the rotation (as opposed to dither) of the gyroscope 2 has the same sense in both the delayed and non-delayed versions. Thus, when they are added, the resultant signal is equivalent to twice the original pulse train, i.e. the scale factor is doubled.

With very high frequency dither, implementation is possible with an analogue delay. However, a the lower frequencies, which are more commonly used, digital techniques are preferred.

Figure 2:
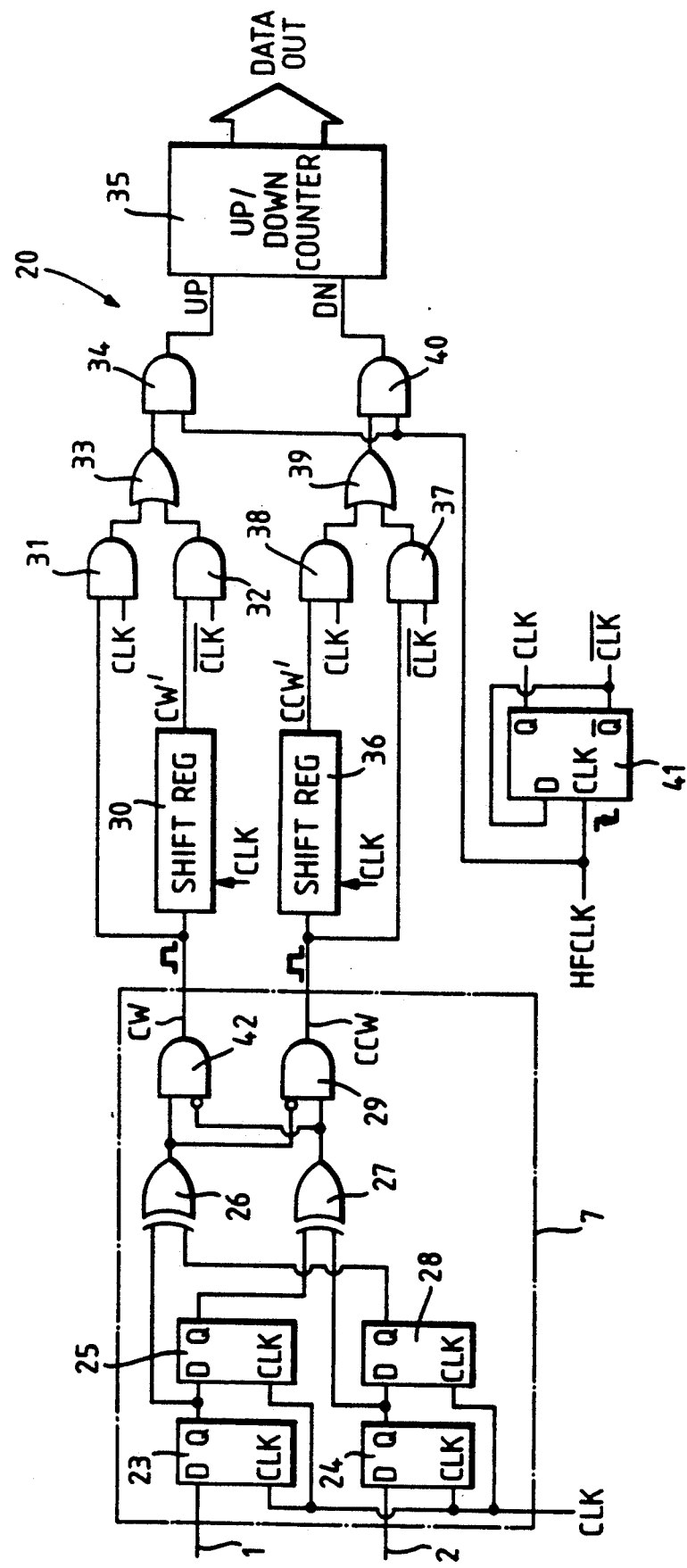
FIG. 2 is a block diagram of a first embodiment of the output signal processor.

Referring to FIG. 2, a digital implementation of the compensation circuitry is shown generally at 20. The circuitry for implementing the direction decoder is contained in box 7. The inputs 21 and 22 to the direction decoder are square waves from Schmitt triggers 5 and 6 respectively. The values of the square waves are stored by respective D flip flops 23 and 24 at each clock cycle and then output at the subsequent clock cycle. The output values represent the square wave values as either binary '0' or '1' (low or high). The output of D flip flop 23 is passed to both the input of another D flip flop 25 and to one input of exclusive-OR gate 26. The output of the flip flop 25, i.e. the input delayed by one clock cycle, is passed to one input of exclusive-OR gate 27. Similarly, the output of D flip flop 24 is passed to both the input of another D flip flop 28 and to a second input of exclusive-OR gate 27, and the output of the flip flop 28 is passed to a second input of exclusive-OR gate 25. The output of exclusive-OR gate 26 is connected to both an input of AND gate 42 and an inverting input of AND gate 29; while the output of exclusive-OR gate 27 is connected to an inverting input of AND gate 42 and an input of AND gate 29. The outputs of the AND gates 42 and 29 are pulse strings which represent clockwise and counter-clockwise rotation respectively (as described with reference to FIG. 1).

The pulse string from AND gate 42 is applied to both n-bit shift register 30 and to one input of AND gate 31, the other input of which is connected to the same clock signal as the D flip flops. The n-bit shift register 30 is clocked by the clock signal, and produces an output which is applied to one input of AND gate 32, the other input of which is connected to receive the inverse of the clock signal. The outputs of AND gates 31, 32 are applied to respective inputs of OR gate 33, the output of which is connected to an input of AND gate 34. A high frequency clock signal, having twice the frequency of the aforementioned clock signal, is applied to the second input of AND gate 34, the output of which is connected to the counter 35 so as to increment the output valve thereof in response to each pulse received from the output of AND gate 34.

The pulse string from AND gate 29 is similarly applied to both n-bit shift register 36 and an input of an AND gate 37. The output of the shift register 36 is applied to AND gate 38, the output of which is applied, with the output of AND gate 37, to OR gate 39, which, in turn, is connected to AND gate 40. The output of AND gate 40 is connected to the counter 35 so as to decrement the output value thereof in response to each pulse received.

The shift registers 30 and 36 provide the required time delay for the pulse trains by way of the time taken for the bits of the pulse string to be clocked along the n-bits of the shift register. The requirement for a half dither period delay is met by setting the clock frequency for all components, except for the two AND gates 34 and 40, to $2 \times n \times$ dither frequency—the two AND gates 34 and 40 being clocked at twice the frequency.

It can be seen that the delayed signal from shift register 30 and non-delayed signal from AND gate 42 are combined at OR gate 33 after passing through respective AND gates 31 and 32 where the AND operation is performed with the clock and inverse clock signals respectively. Thus, the value of the half-dither period delayed signal and the non-delayed signal each occupy a different half of the clock period, and when combined at OR gate 33, a signal of one clock period in duration can represent the sum of the delayed and non-delayed signal by the proportion of time the signal is high during each clock period. The signal is then passed to a further AND gate 34 where the AND operation is performed with the high frequency clock signal which converts the input signal into pulse form, the quantity of which represent the value of the sum of the delayed and non-delayed signal in each clock cycle. This pulses signal is applied to the increment input of counter 35.

The shift register 36, AND gates 37, 38 40 and OR gate 39 operate together in the same way as their counterparts described above, except the pulsed signal produced by AND gate 40 is applied to the decrement input of counter 35.

Thus, the value of the counter output represents the absolute rotation of the gyroscope 2.

One system for producing both high and low frequency clock signals is by use of a D flip flop 41. The high frequency signal is applied to the clock terminal of D flip-flop 41 and the input is connected to the inverted output terminal. Thus, each time the D flip flop is clocked by the high frequency signal, the output of the flip flop will alternate between low and high, i.e. its frequency will be half that of the high frequency clock signal.

Figure 3:
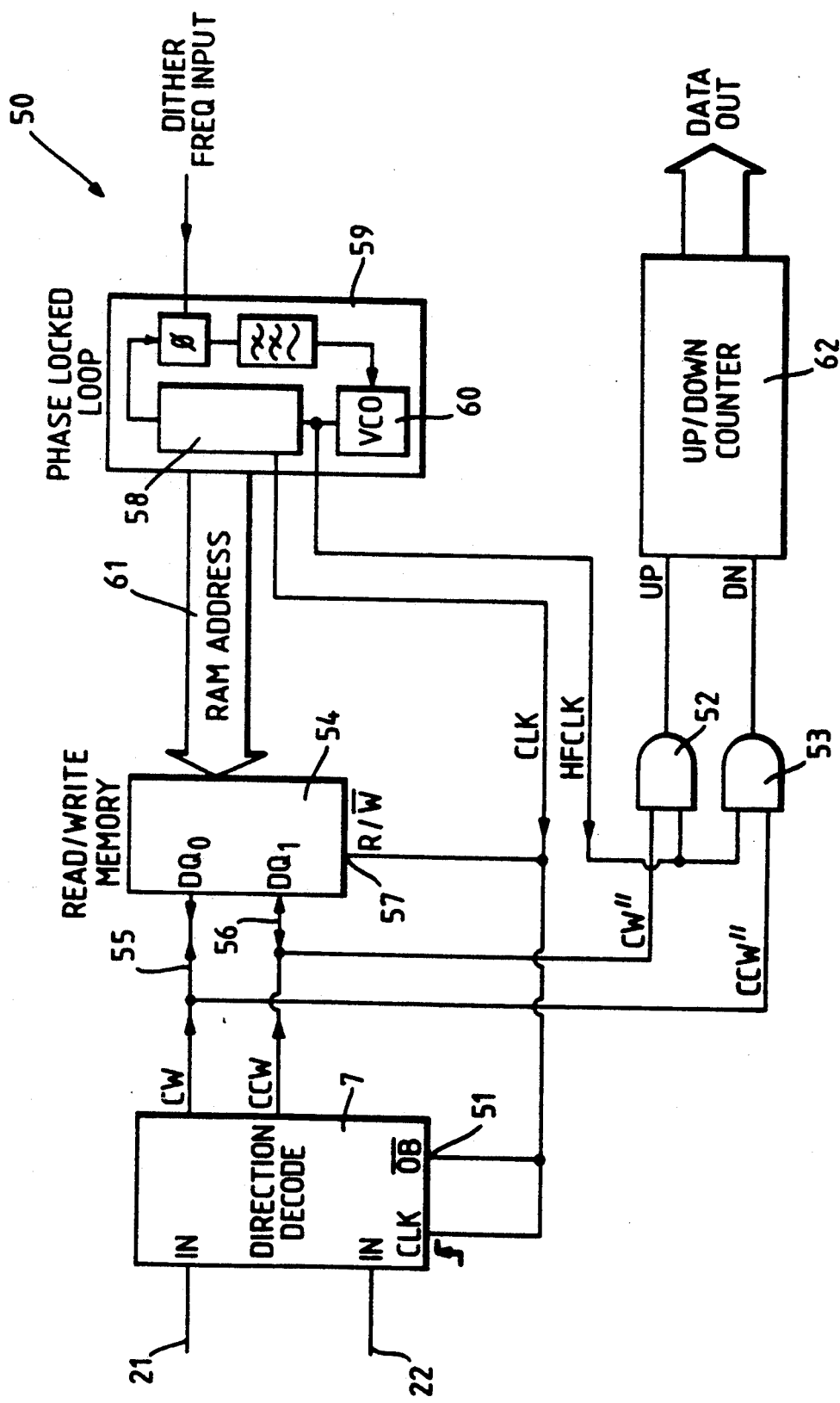
FIG. 3 is a block diagram of a second embodiment of the output signal processor.

Referring now to FIG. 3, an alternative implementation of the compensation circuitry is shown generally at 50. As before the square waves from the Schmitt Triggers 5 and 6 are applied to the inputs 21 and 22 of direction decoder 7 (the circuitry of which is not shown in detail for simplicity—but may be basically the same as that described in relation to FIG. 2). However, the direction decoder uses tri-state devices so that when the third input 51 is low, the output is always low, but when the third input is high the output is previously described with reference to FIG. 1. The direction detector 7 is clocked at the low clock frequency. The outputs of direction decoder 7 are connected both to respective AND gates 52 and 53, the second inputs of which receive a high frequency clock signal, and to memory 54 by means of two respective two-way busses 55 and 56. The read/write action of the memory 54 is controlled by the low-frequency clock signal which is applied to the read/write input 57 of the memory 54. The address inputs of the memory 54 are supplied by n-bit counter 58 which is positioned in the feedback loop of phase locked loop 59.

A signal having the same frequency as the dither signal is applied to the input of the phase locked loop 59, the operation of which is such that the output of voltage controlled oscillator 60 is applied to the counter 58 to cause it to increment its output value. The signal from the voltage controlled oscillator 60 provides the high frequency clock signal. The counter output is passed along address buys 61 to the address input of memory 54. The least significant bit of the counter output has a frequency half that of the voltage controlled oscillator output and is therefore used as the low frequency clock signal. The range of the counter 56 is chosen so that it repeats its output cycle every half dither period.

During the first half of the clock cycle in which the output from the direction decoder 7 is low and the memory is set to 'READ', the value from the counter 58 is passed along address bus 61 to the address input of memory 54 which is configured so that he counter values address locations in the memory and cause their contents to be output, via the two two-way busses 55 and 56, to AND gates 52 and 53. During second half of the clock cycle in which the third input to direction decoder 7 is high and memory is set to 'WRITE', the pulse output from direction decoder 7 is passed, via the two way busses 55 and 56, to memory 54 where the data is stored at an address according to the value from the counter 58. This data is also passed to AND gates 52 and 53.

When the signals are read from memory 54, they have been delayed for half a dither period relative to the current signals form direction decoder 7. Thus the memory 54 provides the required half-dither period delay for the signals.

The AND gates 52 and 53 and counter 62 perform the same function as AND gates 34 and 40 and counter 35 of FIG. 2.

Figure 4:
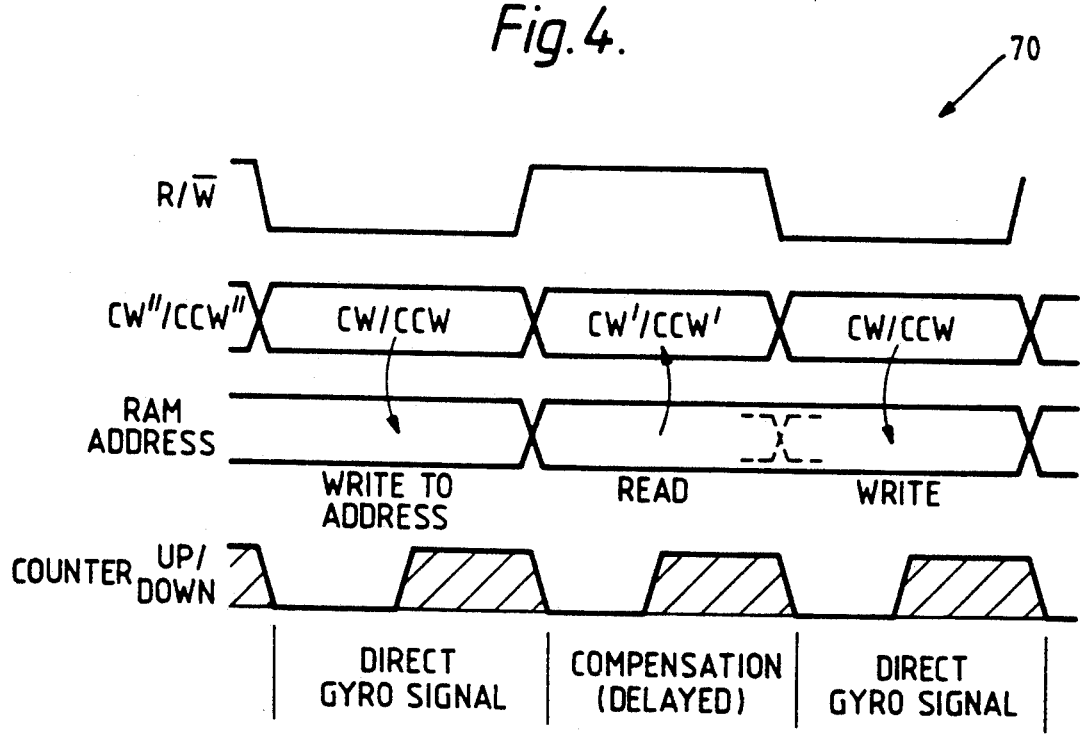
FIG. 4 is a waveform diagram for showing how the electrical signals of the FIG. 3 embodiment might change relative to one another.

Referring to FIG. 4, an example of how the value the various electrical signals in the circuit of FIG. 3 might change relative to one another is shown generally at 70. The electrical signals correspond to the similarly labelled components of FIG. 3.

Figure 5:
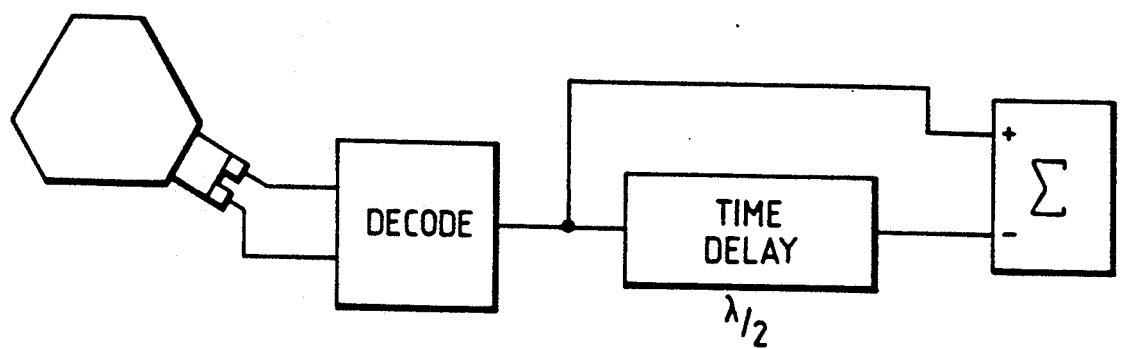
FIG. 5 is a diagram of a signal processor.
Figure 6:
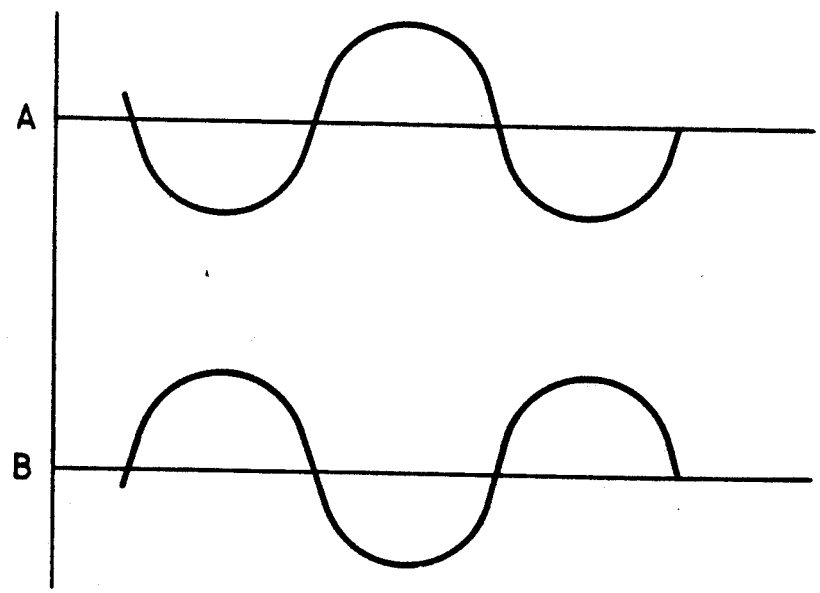
FIG. 6 shows two wave form diagrams.

FIG. 5 shows a general embodiment in which output signals 100 and 101 from laser gyroscope 102 are fed to decoder 103 to produce a signal 104 including a dither component which is substantially symmetrical as shown at A in FIG. 6. The signal 104 is delayed by a period λ to produce signal 105 as shown at B in FIG. 6 and the signals 104 and 105 are applied to summer 106 where the dither components cancel.

I claim:

1. A ring laser gyroscope comprising:
   a body having portions defining a continuous path within the body for laser radiation beam components to pass along the path in respective opposite directions;
   dither means connected to said body for imparting an angular oscillatory dither motion to said body;
   radiation sensitive means positioned for receiving said radiation beams and for forming electrical signals representative of the said beams; and
   direction sensing means connected to the radiation sensitive means for using said electrical signals to form clockwise and counterclockwise signals which are representative of rotation of said body in respective ones of two opposite directions;
   delay means connected to the direction sensing means for delaying the clockwise and counterclockwise signals, said delay means comprising two shift registers; and
   combining means connected to the delay means for combining output of the delay means with the respective clockwise and counterclockwise signals for deriving a signal representative of rotation of the body.

2. A ring laser gyroscope according to claim 1, wherein said delay means is operable for delaying the clockwise and counterclockwise signals by an amount equal to half period of said dither motion.

3. A ring laser gyroscope comprising:
   a body having portions defining a continuous path within the body for laser radiation beam components to pass along the path in respective opposite directions;
   dither means connected to said body for imparting an angular oscillatory dither motion to said body;
   radiation sensitive means positioned for receiving said radiation beams and for forming electrical signals representative of the said beams; and
   direction sensing means connected to the radiation sensitive means for using said electrical signals to form clockwise and counterclockwise signals which are representative of rotation of said body in respective ones of two opposite directions;
   delay means connected to the direction sensing means for delaying the clockwise and counterclockwise signals, said delay means comprising electrical storage means and addressing means, coupled to the storage means for controlling access to the storage means, for providing a delay between storage of a signal in said storage means and read-out of same signal; and
   combining means connected to the delay means for combining output of the delay means with the respective clockwise and counterclockwise signals for deriving a signal representative of rotation of the body.

4. A ring laser gyroscope according to claim 3, wherein said delay means is operable for delaying the clockwise and counterclockwise signals by an amount equal to half period of said dither motion.

* * * * *